US012326248B2

(12) United States Patent
Stoneham et al.

(10) Patent No.: US 12,326,248 B2
(45) Date of Patent: Jun. 10, 2025

(54) SEALED LINEAR LIGHTING FIXTURE

(71) Applicants: Edward B. Stoneham, Las Vegas, NV (US); Chiamin Cheng, Saratoga, CA (US)

(72) Inventors: Edward B. Stoneham, Las Vegas, NV (US); Chiamin Cheng, Saratoga, CA (US)

( * ) Notice: Subject to any disclaimer, the term of this patent is extended or adjusted under 35 U.S.C. 154(b) by 0 days.

(21) Appl. No.: 18/693,165

(22) PCT Filed: Sep. 26, 2022

(86) PCT No.: PCT/US2022/044768
§ 371 (c)(1),
(2) Date: Mar. 19, 2024

(87) PCT Pub. No.: WO2023/049478
PCT Pub. Date: Mar. 30, 2023

(65) Prior Publication Data

US 2025/0129927 A1 Apr. 24, 2025

Related U.S. Application Data

(60) Provisional application No. 63/249,006, filed on Sep. 27, 2021.

(51) Int. Cl.

| | |
|---|---|
| ***F21V 31/00*** | (2006.01) |
| ***F21V 17/16*** | (2006.01) |
| ***F21V 29/70*** | (2015.01) |
| *F21Y 103/10* | (2016.01) |
| *F21Y 115/10* | (2016.01) |

(52) U.S. Cl.
CPC .......... *F21V 31/005* (2013.01); *F21V 17/162* (2013.01); *F21V 29/70* (2015.01); *F21Y 2103/10* (2016.08); *F21Y 2115/10* (2016.08)

(58) Field of Classification Search
CPC ...... F21V 31/005; F21V 17/162; F21V 29/70; F21V 29/503; F21Y 2103/10; F21Y 2115/10; F21S 4/28
See application file for complete search history.

(56) References Cited

U.S. PATENT DOCUMENTS

2012/0127707 A1* 5/2012 Stoneham ............... F21V 29/71 363/126

FOREIGN PATENT DOCUMENTS

WO WO-2020215042 A1 * 10/2020 ............... F21K 9/90

* cited by examiner

*Primary Examiner* — Kevin Quarterman

(57) ABSTRACT

A sealed linear lighting fixture example comprises a heat sink, an electrical cable, two end caps, two compressive clips, a light-emitting element, an electrical assembly, two end blocks, four gaskets, a lens, and some fasteners. The heat sink and end blocks enclose the electrical assembly. The light-emitting element connects to the electrical assembly through a port in the enclosure wall. An end block acts as a strain relief for the electrical cable and facilitates a seal between the cable and an end cap. An end gasket facilitates a seal between an end cap and an end of the heat sink. Grooves in the heat sink and the end caps retain a lens gasket that seals the lens to the rest of the structure. The compressive clips press the lens against the lens gasket and include catches that engage ridges on the heat sink.

11 Claims, 12 Drawing Sheets

SEALED LINEAR LIGHTING FIXTURE

RELATED APPLICATIONS

This application claims the benefit of U.S. Provisional Application No. 63/249,006, with filing date Sep. 27, 2021, which application is incorporated herein by reference in its entirety for all purposes.

BACKGROUND

An electrical lighting fixture usually comprises a light-emitting element, an electrical cable, a heat sink, and a protective enclosure. The light-emitting element produces and radiates the light. The electrical cable delivers to the fixture the electrical power that is used to produce the light. The heat sink transfers to the environment most of the heat that is generated in the fixture. The protective enclosure reduces the probability that external influences, including exposure to water or mechanical influences will damage the light-emitting element or other contents of the fixture. The protective enclosure also may serve to protect humans and other animals from electrical shock or burns and to reduce the likelihood that the fixture might cause a fire.

An electrical lighting fixture, particularly one in which light-emitting diodes, lasers, or gaseous discharges are used in the light-emitting element, may include, in addition, one or more electrical assemblies that condition the power from the electrical cable for appropriate application to the light-emitting element. Electrical connections between the electrical cable and the one or more electrical assemblies and between the one or more electrical assemblies and the light-emitting element are also included. The one or more electrical assemblies and electrical connections may be situated within the protective enclosure.

SUMMARY

A linear lighting fixture is described that may be sealed to prevent the intrusion of water and other environmental hazards.

In an example, a sealed linear lighting fixture comprises a heat sink, an electrical cable, two end caps, two compressive clips, a light-emitting element, an electrical assembly, two end blocks, four gaskets, a lens, and several fasteners.

In this example, the heat sink encompasses an interior space that contains the electrical assembly and the two end blocks. The light-emitting element is mounted to a mounting surface on the outer side of a bottom wall portion of the heat sink. A connection port through the bottom wall portion of the heat sink allows one or more electrically conducting terminals of a light-emitting-element connector on the light-emitting element to make electrical contact with a connector on the electrical assembly.

One of the end blocks is located at each end of the heat sink. Each is fastened to the heat sink. At one end the electrical cable passes through a cable tunnel in the end block and is pressed into an S-shaped groove in the end block to provide strain relief. At each end one of the end caps is fastened to the end block with a flat end gasket situated between the end cap and the end of the heat sink forming a seal between the two. At the end where the electrical cable emerges from the end block the electrical cable passes through a hole in the end gasket, and an O-ring surrounding the electrical cable acts under the compressive action of a recessed sealing surface on the end block to seal the electrical cable to the end cap.

A first groove and a second groove in the heat sink and a turnaround groove in each end cap capture a continuous O-ring elastomeric gasket. The lens is pressed against the elastomeric gasket by two compressive clips, one on each of two sides of the lens, thereby sealing a space that contains the light-emitting element and completing the overall sealing of the linear lighting fixture.

DETAILED DESCRIPTION OF VARIOUS EMBODIMENTS

A sealed linear lighting fixture will become better understood through review of the following detailed description in conjunction with the drawings. The detailed description and drawings provide examples of the various embodiments described herein. Those skilled in the art will understand that the disclosed examples may be varied, modified, and altered without departing from the scope of the disclosed structures. Many variations are contemplated for different applications and design considerations; however, for the sake of brevity, not every contemplated variation is individually described in the following detailed description.

Examples of a sealed linear lighting fixture are now described in more detail with reference to FIGS. 1-14. In the various figures, like or similar features may have the same reference labels.

Figure 1:
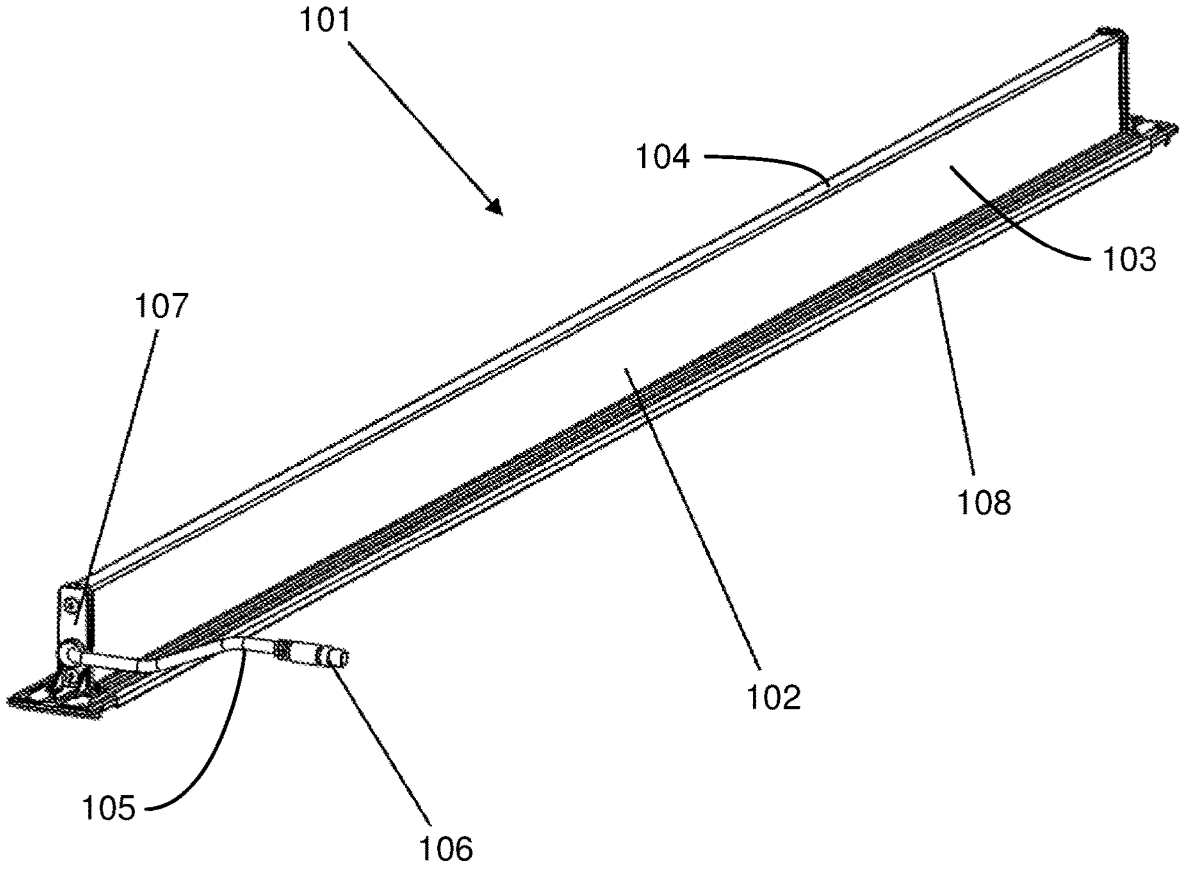
FIG. 1 shows an example of a sealed linear lighting fixture viewed from one perspective and indicates various parts that are visible.

FIG. 1 is a drawing illustrating an example of a sealed linear lighting fixture 101 as viewed from one perspective. Lighting fixture 101 includes a heat sink 102 having a substantially uniform cross section in planes normal to an axis. Heat sink 102 may be fabricated, for example, from aluminum through a process of extrusion. Visible in FIG. 1 are a right wall portion 103 and a top wall portion 104 of heat sink 102. Lighting fixture 101 may also include an electrical cable 105, and electrical cable 105 may include a cable connector 106. Also included in the example of lighting fixture 101 may be at least a first end cap 107 and two or more compressive clips 108.

Figure 2:
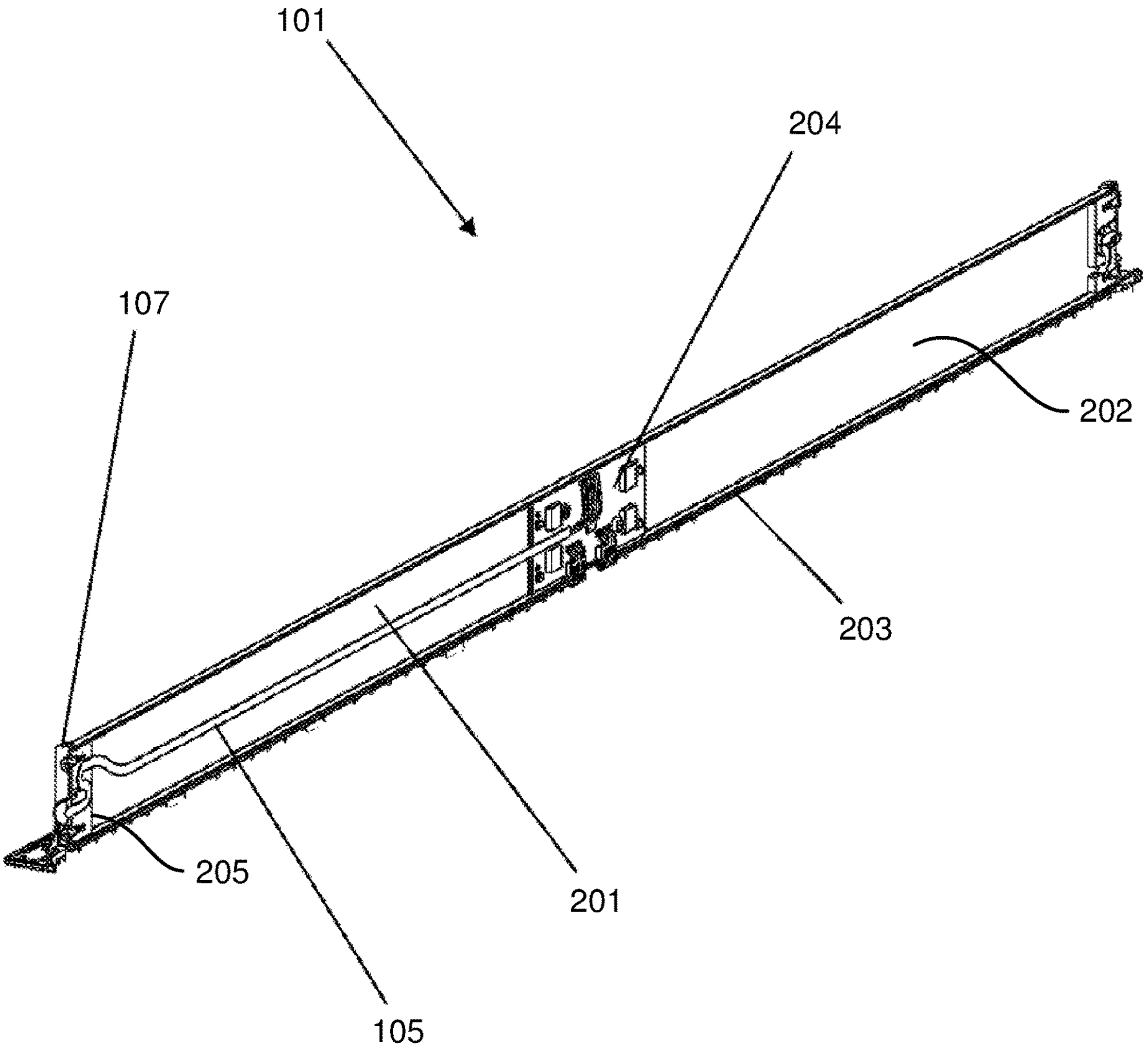
FIG. 2 shows a cutaway view of the example in FIG. 1 revealing items within the interior space of the heat sink and revealing the position of the light-emitting element.

FIG. 2 is a cutaway view of the lighting fixture 101 example of FIG. 1 revealing a left wall portion 201 of the heat sink 102, an interior space 202 encompassed by the heat sink 102, and a light-emitting element 203 located outside of interior space 202. Visible within the interior space 202 are an electrical assembly 204, a cutaway remnant of at least a first end block 205, and a cutaway remnant of a portion of electrical cable 105.

Figure 3:
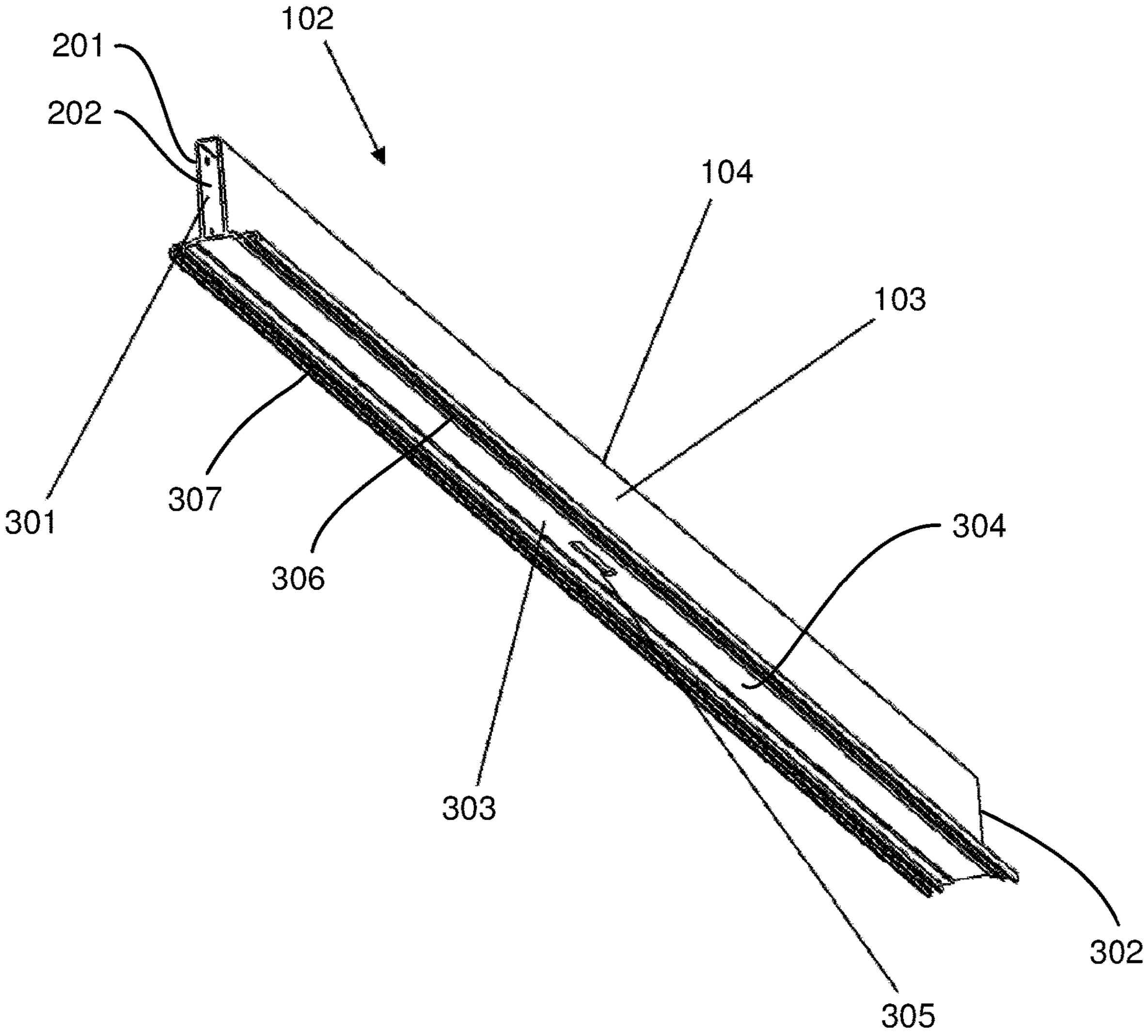
FIG. 3 shows the heat sink of the example in FIG. 1 viewed from a different perspective and indicates various features of the heat sink.

FIG. 3 shows the heat sink 102 of the example in FIG. 1 viewed from a different perspective and indicates various features of the heat sink. The heat sink has a first end 301, a second end 302, and a bottom wall portion 303 the outer surface of which may act as a mounting surface 304 that may conduct heat away from the light-emitting element 203 when the light-emitting element is mounted to the mounting surface 304 as shown in FIG. 2. Mounting surface 304 may be perforated to form a connection port 305. Heat sink 102 in this example includes a first groove 306 and a second groove 307 that are capable of holding gasket material.

Figure 4:
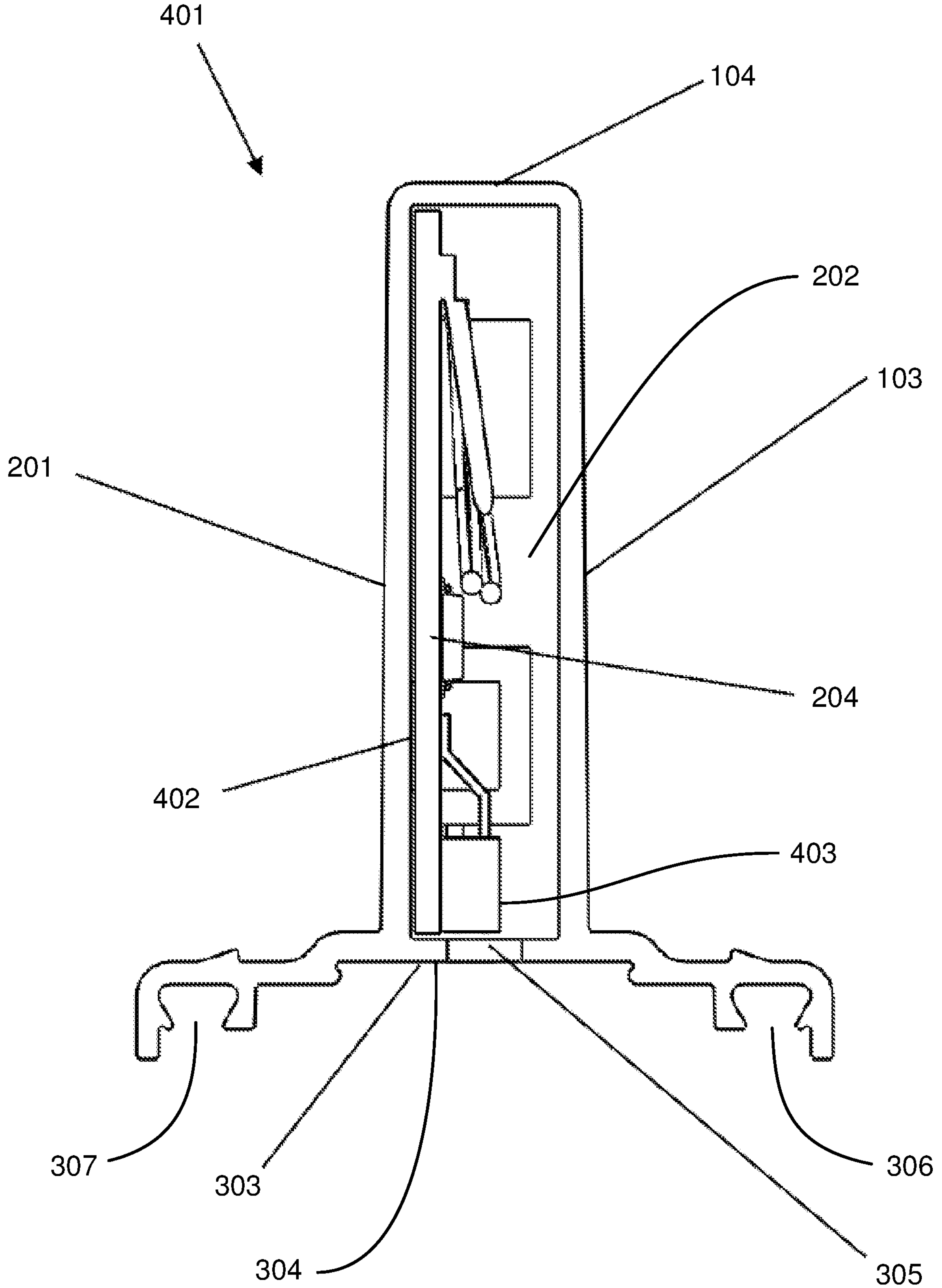
FIG. 4 shows an end-on view of the heat sink of FIG. 3 with an electrical assembly situated within the interior space.

FIG. 4 shows an end-on view of a combination 401 of heat sink of FIG. 3 with the electrical assembly 204 situated within the interior space 202. Interior space 202 is encompassed on four sides by right wall portion 103, top wall portion 104, left wall portion 201, and bottom wall portion 303. The electrical assembly 204 may be mounted to or have a thermal connection 402 to a wall portion, such as left wall portion 201, and may include an electrical assembly connector 403 in close proximity to connection port 305.

Figure 5:
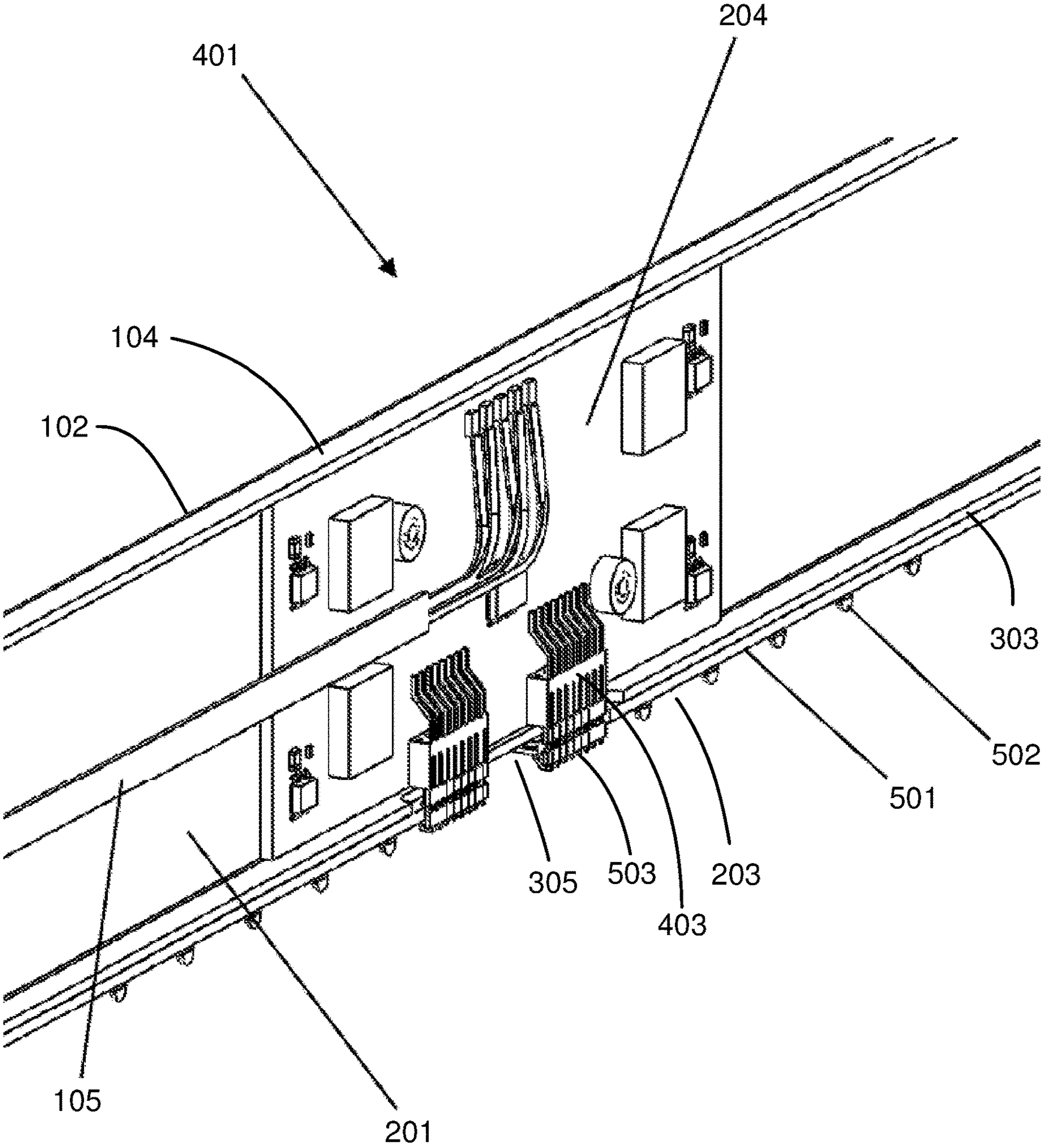
FIG. 5 shows a close-up view of a portion of the cutaway view of FIG. 2 revealing the connections made through the connection port in the heat sink.

FIG. 5 shows a close-up view of a portion of the cutaway view of FIG. 2 including the combination 401 of the heat sink 102, the light-emitting element 203, and the electrical assembly 204 revealing the connections made through the connection port 305 in the bottom wall portion 303 of the heat sink 102. In this example the light-emitting element 203 comprises light-emitting-diode printed circuit board 501, one or more light-emitting diodes 502, and light-emitting-element connector 503.

Figure 6:
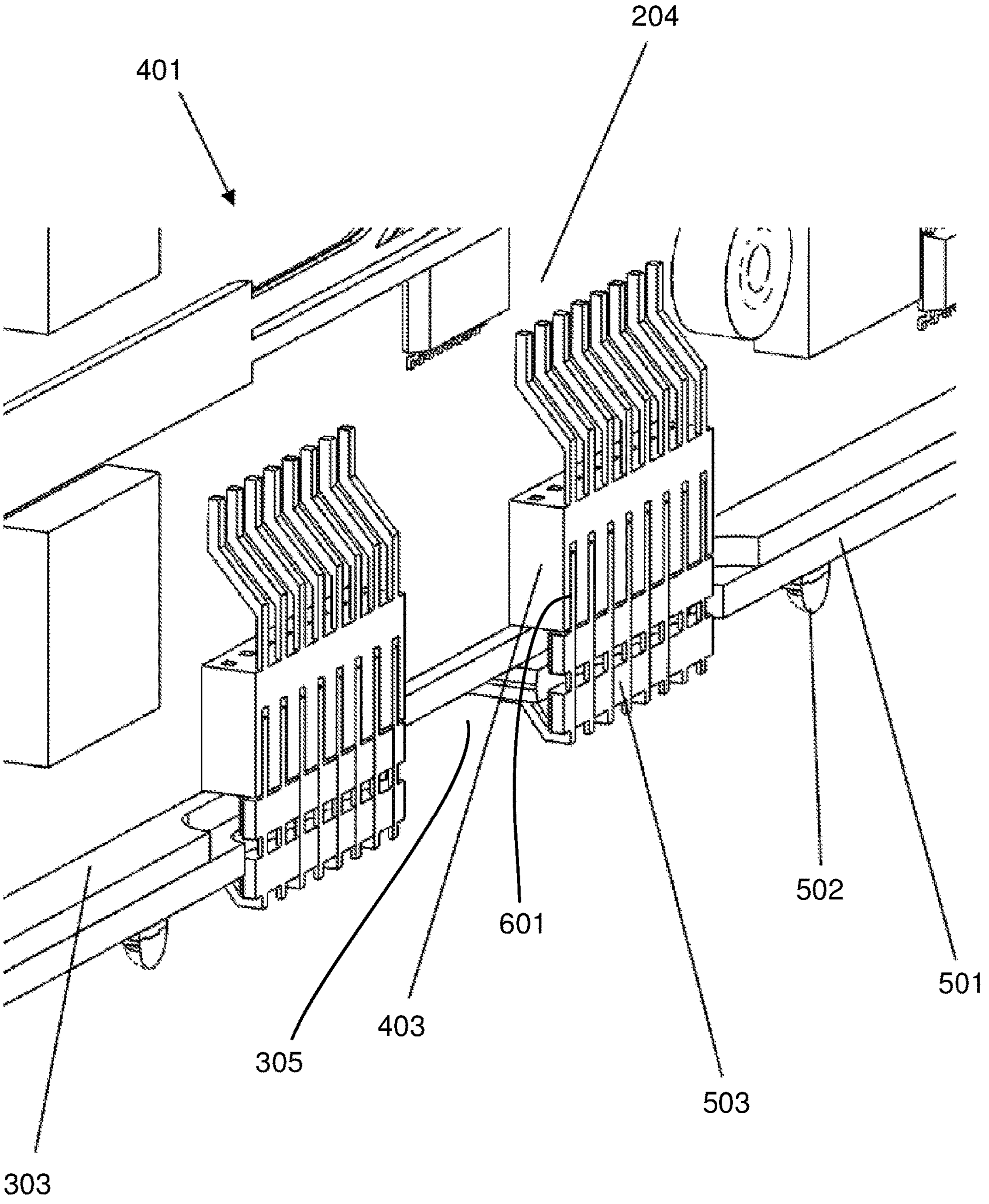
FIG. 6 shows a close-up view of a portion of the cutaway view of FIG. 5 revealing the connections made with electrically conducting terminals.

FIG. 6 shows a close-up view of a portion of the cutaway view of FIG. 5 revealing connections made in this example with electrically conducting terminals 601 extending from light-emitting element connector 503 through connection port 305 and into electrical assembly connector 403. The electrically conducting terminals 601 may be in the form of pins, sockets, or other shapes suitable for electrical connection to a connector.

Figure 7:
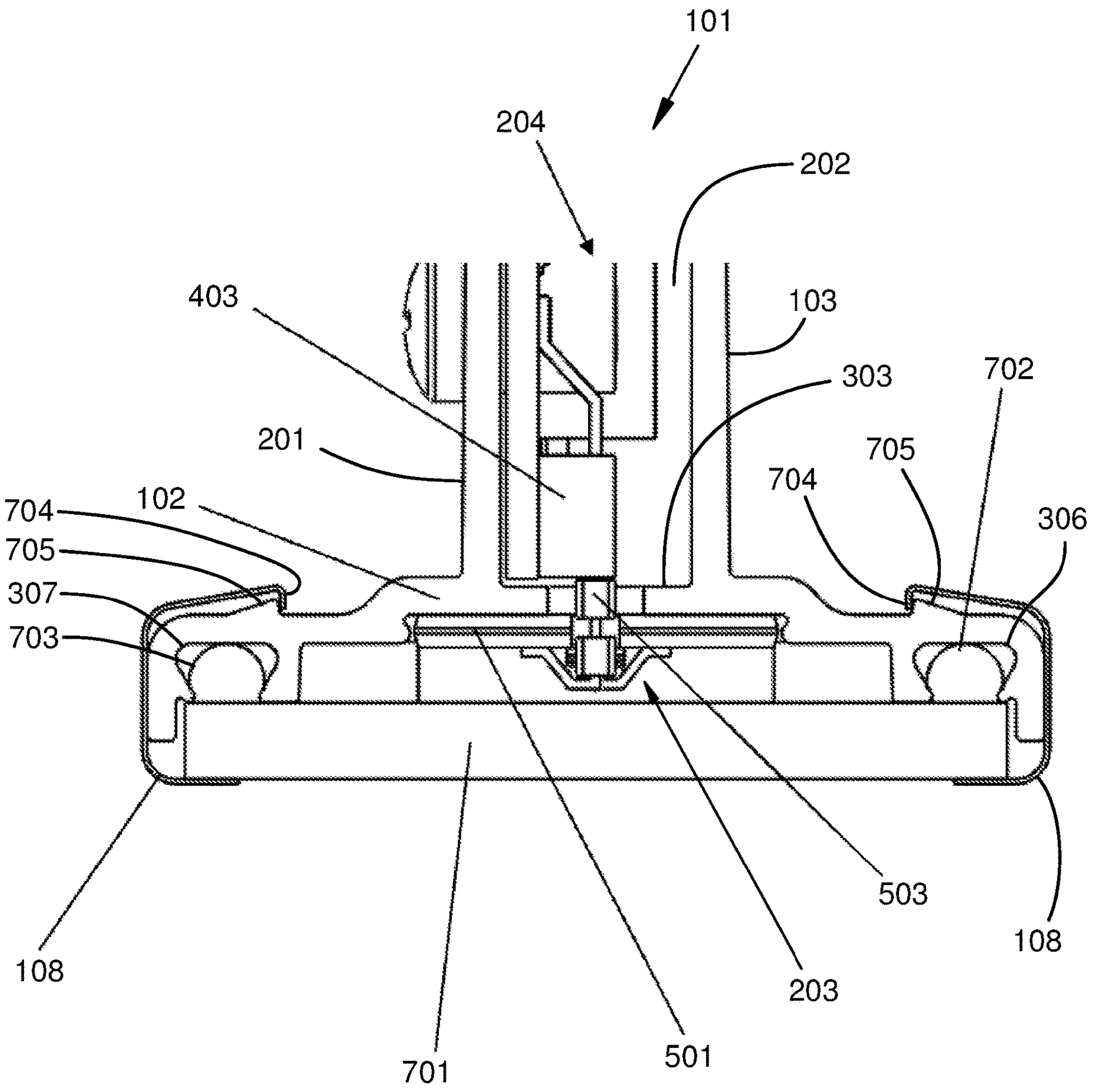
FIG. 7 shows a cutaway view of the example of FIG. 1 seen end-on at the plane of the first end of the heat sink.

FIG. 7 shows a cutaway view of the linear lighting fixture 101 example of FIG. 1 seen end-on at the plane of the first end 301 of the heat sink 102. Included in linear lighting fixture 101 is a lens 701 that may be translucent or transparent to the light emitted by the light-emitting element 203. A first portion of the lens gasket 702 is positioned in and captured by first groove 306, and a second portion of the lens gasket 703 is positioned in and captured by second groove 307. Two or more compressive clips 108 are positioned to press the lens 701 against the first portion of the lens gasket 702 and second portion of the lens gasket 703, thereby effecting a waterproof seal between the lens 701 and the heatsink 102. In this example, each lens clip 108 may have a catch 704 that engages a ridge 705 on the heat sink 102. The catch 704 and ridge 705 may serve to secure the lens clip 108 firmly within the linear lighting fixture 101.

Figure 8:
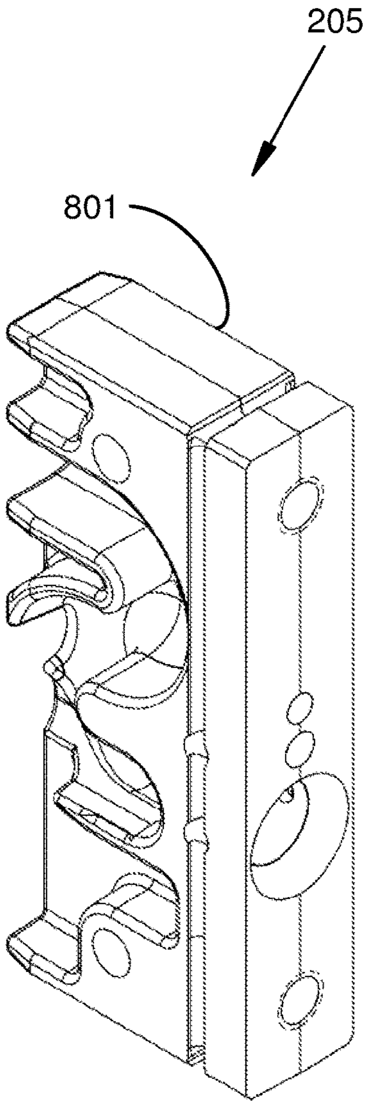
FIG. 8 shows an example of a first end block viewed from a particular perspective.

FIG. 8 shows an example of first end block 205 viewed from a particular perspective. A right end block surface 801 is indicated but is not visible in the figure.

Figure 9:
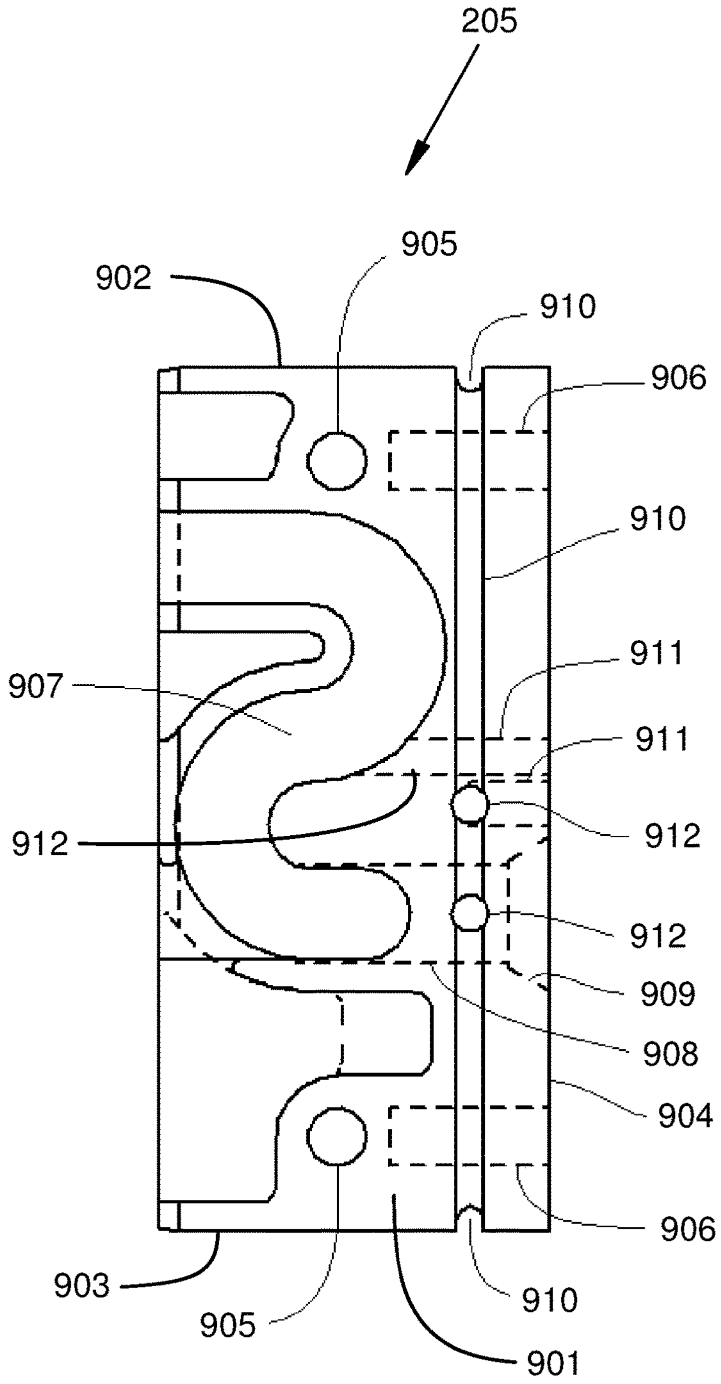
FIG. 9 indicates various features of the end block of FIG. 8 as viewed from its left side.

FIG. 9 indicates various features of first end block 205 of FIG. 8 as viewed from a vantage point facing a left end block surface 901. In this example, first end block 205 has a top end block surface 902, a bottom end block surface 903, and an outer end surface 904. A first fastening provision 905 is provided to allow fastening of first end block 205 to the left wall portion 201 of the heat sink 102. A second fastening provision 906 is provided to allow fastening of first end cap 107 to first end block 205. The first fastening provision 905 and the second fastening provision 906 may, for example, each be one or more threaded screw holes tapped into first end block 205.

In this example, first end block 205 may have an S-shaped groove 907 cut into the left end block surface, the width and depth of the S-shaped groove 907 being such that the electrical cable 105 can be laid snugly into the groove when the electrical cable 105 passes through a cable tunnel 908 emerging through the outer end surface 904. A recessed sealing surface 909 encircling the cable tunnel 908 where the latter meets the outer end surface 904 may be provided to help in sealing the electrical cable 105 to first end cap 107.

A continuous encircling groove 910 may be cut into right end block surface 801, left end block surface 901, top end block surface 902, and bottom end block surface 903 to serve as a conduit for sealant intended to seal first end block 205 to the insides of right wall portion 103, top wall portion 104, left wall portion 201, and bottom wall portion 303 of the heat sink 102. One or more sealant injection holes 911 may penetrate first end block 205 from the outer end surface 904 to act as ducts through which sealant can be injected. One or more sealant channels 912 may be provided to allow sealant to flow from one sealant injection hole 911 to the continuous encircling groove 910, between one sealant injection hole 911 and the cable tunnel 908, between the continuous encircling groove 910 and the cable tunnel 908, and/or between one sealant injection hole 911 and the S-shaped groove 907.

Figure 10:
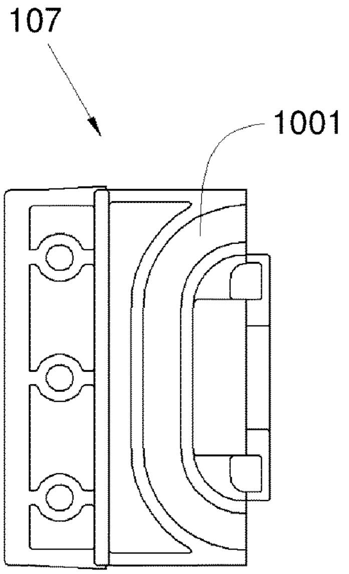
FIG. 10 shows a bottom view of the first end cap from the example in FIG. 1 and reveals a turnaround groove for the lens gasket.

FIG. 10 shows a bottom view of the first end cap 107 from the example in FIG. 1 and reveals a turnaround groove 1001 for the lens gasket.

Figure 11:
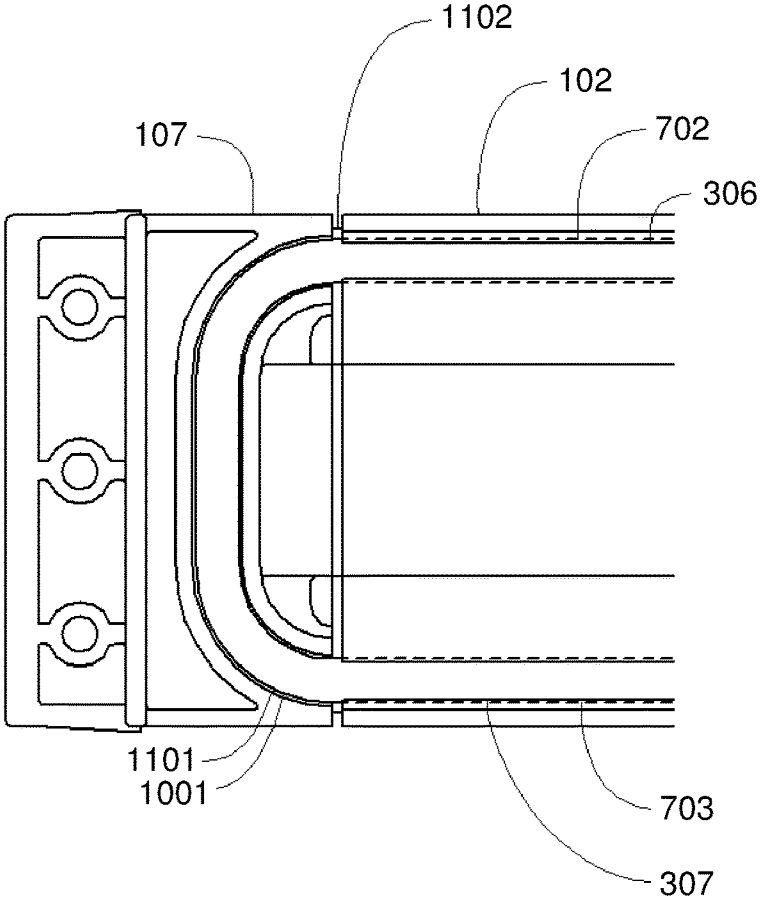
FIG. 11 shows a bottom view of the end cap, the end gasket, the heat sink, and the lens gasket in the sealed linear lighting fixture example of FIG. 1.

FIG. 11 shows a bottom view of first end cap 107, the heat sink 102, the first portion of the lens gasket 702, the second portion of the lens gasket 703, a turnaround portion of the lens gasket 1101, and a first end gasket 1102 in the sealed linear lighting fixture 101 example of FIG. 1. The turnaround portion of the lens gasket 1101 lies within the turnaround groove 1001 in the first end cap 107.

Figure 12:
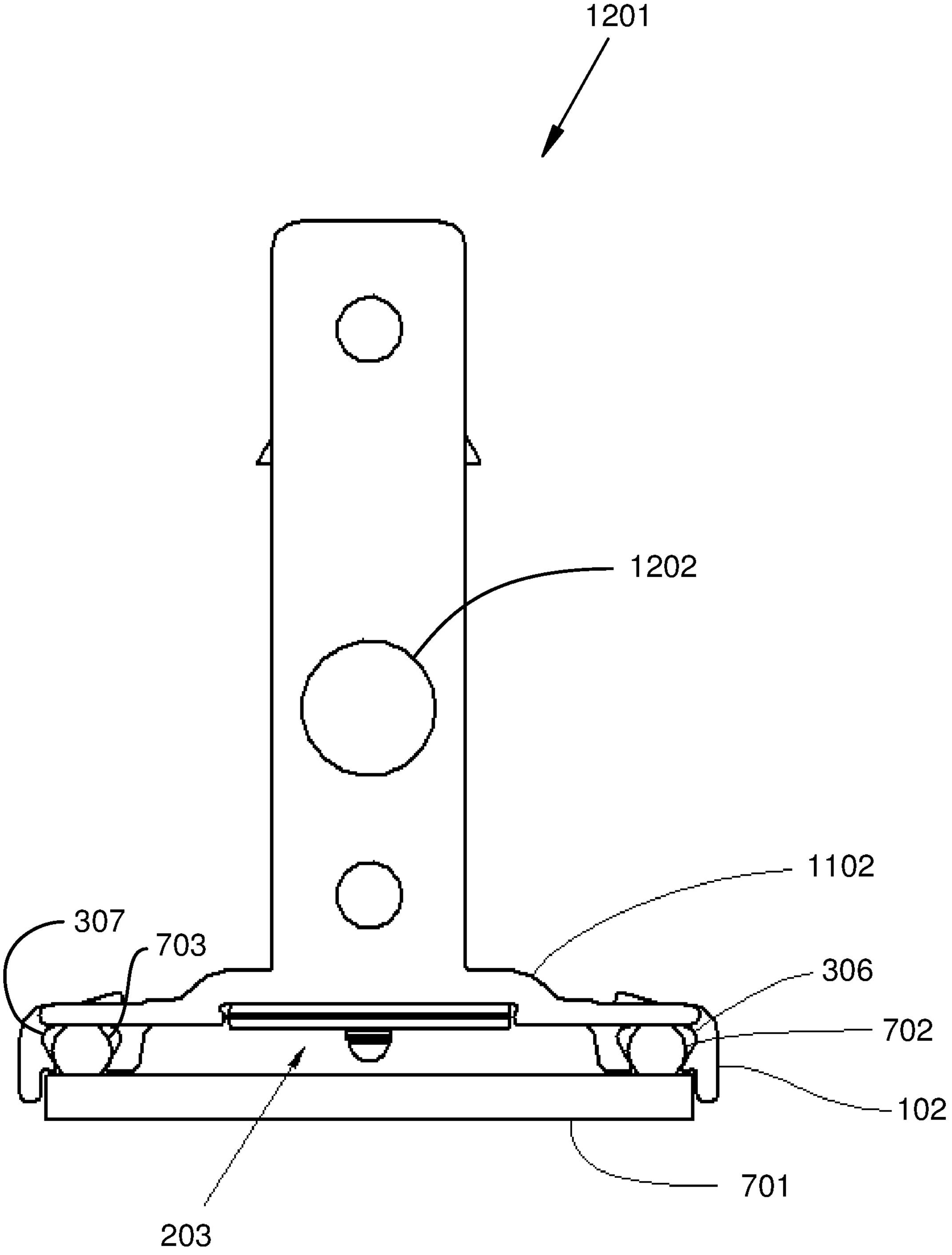
FIG. 12 shows an end-on view of the heat sink and the light-emitting element and includes the end gasket and cutaways of the lens and lens gasket at the first end of the sealed linear lighting fixture example of FIG. 1.

FIG. 12 shows an end-on view of a selection 1201 of the heat sink 102 and the light-emitting element 203 and includes the first end gasket 1102 and cutaways of the lens 701, the first portion of the lens gasket 702, and the second portion of the lens gasket 703 at the first end 301 of the heat sink 102 in the linear lighting fixture example of FIG. 1. It can be noted in this example that first end gasket 1102 extends laterally over the first end 301 of the heat sink 102 at least far enough to touch the first and second portions of the lens gasket 702 and 703. First end cap 107 squeezes first end gasket 1102 over the entire area of first end gasket 1102 effecting a seal between first end cap 107 and the first end 301 of the heat sink 102. This seal, along with the seal effected by the first and second portions of the lens gasket 702 and 703 and the lens 701, completes a seal that surrounds on four sides the light-emitting element 203.

Figure 13:
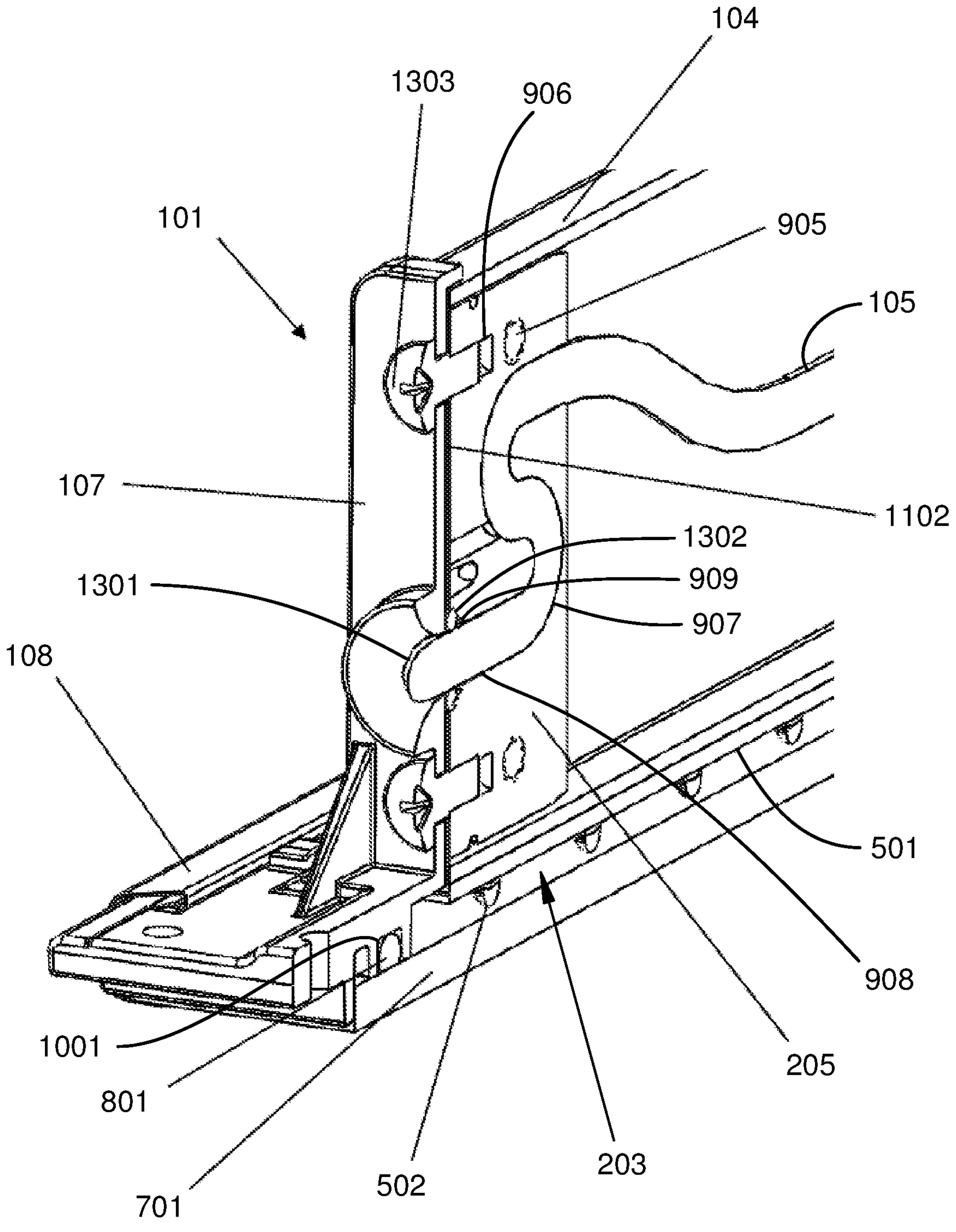
FIG. 13 shows a cutaway view of the first end of the sealed linear lighting fixture example of FIG. 1 and reveals the path of the electrical cable through the S-shaped groove and the cable tunnel in the end block, through the gasket cable hole, and through the cable exit hole in the end cap. It also reveals the location of the cable gasket.

FIG. 13 a cutaway view at the first end 301 of the heat sink 102 of the linear lighting fixture 101 example of FIG. 1 and reveals the path of the electrical cable 105 through the S-shaped groove 907 and the cable tunnel 908 in first end block 205, through the gasket cable hole 1202, and through a cable exit hole 1301 in first end cap 107. Also revealed are the location of a cable gasket 1302 that encircles the electrical cable 105 and an example of a fastener 1303 that engages second fastening provision 906 in first end block 205.

Figure 14:
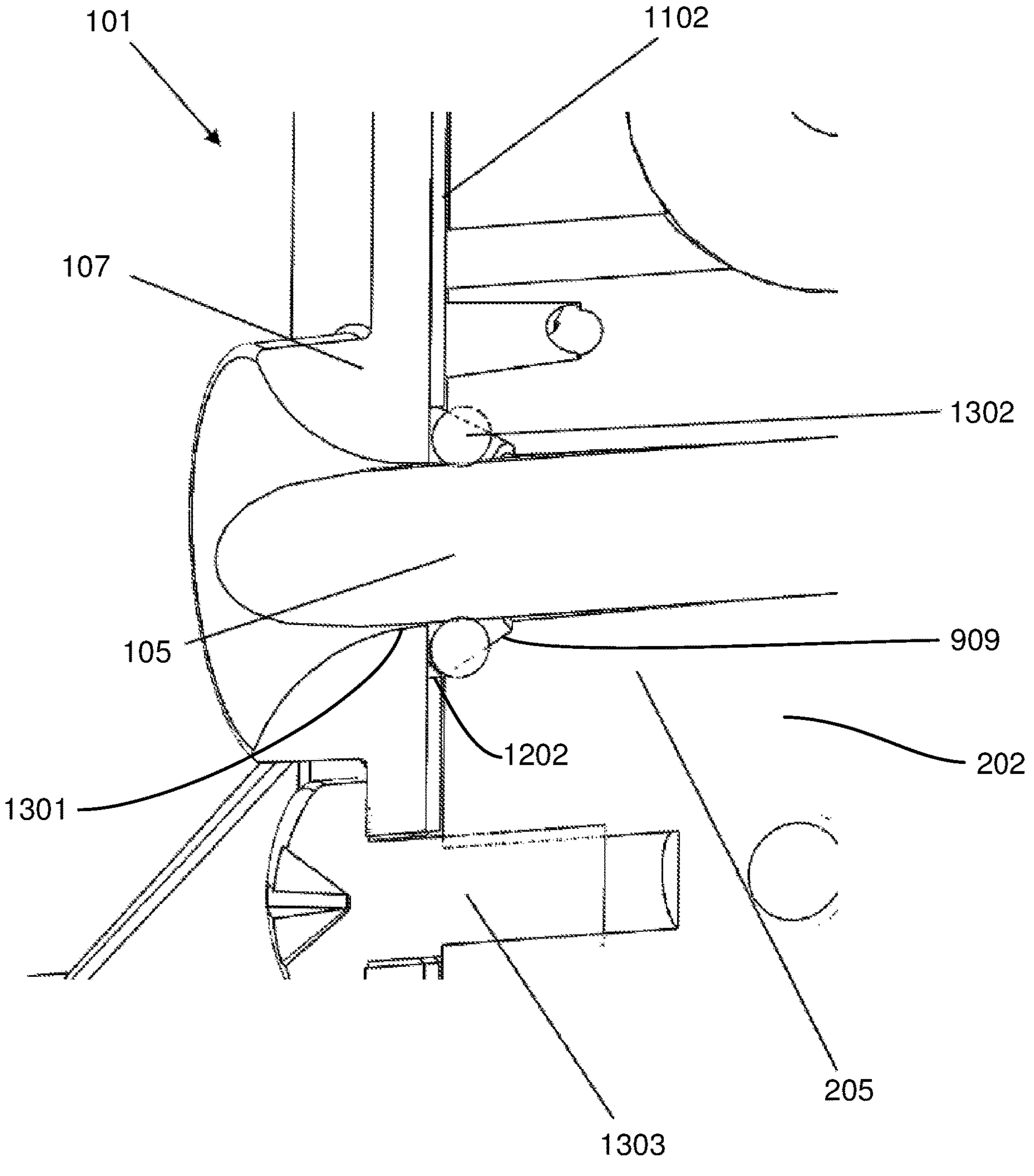
FIG. 14 shows a close-up view of a portion of the view shown in FIG. 13.

FIG. 14 shows a magnified view of a portion of the linear lighting fixture 101 shown in FIG. 13. The cable gasket 1302 encircling the electrical cable 105 in this example is situated partially within the recessed sealing surface 909 in first end block 205 and within the gasket cable hole 1202 and is in contact with first end cap 107. Under pressure applied by the one or more fasteners 1303, the cable gasket 1302 is squeezed against the recessed sealing surface 909, first end cap 107, and the electrical cable 105. The electrical cable 105 may thus be sealed against first end cap 107, preventing intrusion of water or other substances through the cable exit hole 1301 into the interior space 202.

In the example of a linear lighting fixture 101 thus far presented, first end cap 107, first end block 205, and first end gasket 1102, all located at the first end 301 of the heat sink 102, have been described. A second end cap, second end block, and second end gasket may be similarly located at the second end 302 of the heat sink 102. In some embodiments an electrical cable similar to electrical cable 105 may be included at the second end 302 and a second cable gasket similar to cable gasket 1302 may be included. In other embodiments a second electrical cable and cable gasket may not be included. A second end block may be either identical to or different from first end block 205. The S-shaped groove 907, the cable tunnel 908, and/or the recessed sealing surface 909 of first end block 205 may be omitted from a second end block. The cable exit hole 1301 in first end cap 107 may be omitted in a second end cap. The gasket cable hole 1202 in first end gasket 1102 may be omitted in a second end gasket. Other embodiments may include some features of the examples previously described while omitting other features.

Accordingly, while embodiments have been particularly shown and described, many variations may be made therein. Other combinations of features, functions, elements, and/or properties may be used. Such variations, whether they are directed to different combinations or directed to the same combinations, whether different, broader, narrower, or equal in scope, are also included.

The remainder of this section describes additional aspects and features of a sealed linear lighting fixture presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference, in any suitable manner. Some of the paragraphs below expressly refer to and further limit other paragraphs, providing without limitation examples of some of the suitable combinations.

A1. A linear fixture for protecting and removing heat from a light-emitting element, the light-emitting element having a thermal-interface surface that is substantially planar, and the light-emitting element having an electrical connector with one or more electrically conducting terminals emerging normal to the thermal-interface surface, the linear fixture comprising:

a heat sink having a first end and a second end, the heat sink extending along a length axis from the first end to the second end, and the heat sink having a substantially uniform cross section in planes normal to the length axis between the first end and the second end; the heat sink including a top wall portion, a bottom wall portion, a right wall portion, and a left wall portion, the four wall portions together encompassing on four sides an interior space; the bottom wall portion having on its side opposite the interior space a mounting surface of areal extent sufficient to allow contact with the thermal-interface surface of the light-emitting element; the bottom wall portion also having a connection port through which the one or more electrically conducting terminals emerging normal to the thermal-interface surface of the light-emitting element may pass to reach the interior space; and the interior space having disposed within it an electrical assembly including an electrical assembly connector positioned to make electrical contact with the one or more electrically conducting terminals.

A2. The linear fixture of paragraph A1, wherein the heat sink includes a first groove and a second groove both located outside of the interior space in positions on opposite sides of a plane containing the length axis and oriented normal to the mounting surface of the bottom wall portion of the heat sink, the first groove and the second groove shaped to accept and hold in place a lens gasket.

A3. The linear fixture of paragraph A2, further including a first portion of the lens gasket held in place within the first groove, a second portion of the lens gasket held in place within the second groove, and a light-transmitting lens in contact with the first portion and the second portion of the lens gasket, a water-tight seal being effected between the lens and the heat sink along the full length of the heat sink.

A4. The linear fixture of paragraph A3 further including a first end block having a right end block surface adjacent to the right wall portion of the heat sink, a left end block surface adjacent to the left wall portion of the heat sink, a top end block surface adjacent to the top wall portion of the heat sink, a bottom end block surface adjacent to the bottom wall portion of the heat sink, and an outer end surface that may be flush with the first end of the heat sink, the first end block including a first fastening provision facilitating the fastening of the first end block to a wall portion of the heat sink, and a second fastening provision facilitating the fastening of an arbitrary object to the outer end surface of the first end block.

A5. The linear fixture of paragraph A4, wherein the first end block includes an S-shaped groove recessed into the left end block surface, a cable tunnel exiting the outer end surface and penetrating to the S-shaped groove, and a recessed sealing surface surrounding the cable tunnel where the cable tunnel exits the outer end surface.

A6. The linear fixture of paragraph A4, wherein the first end block includes a continuous encircling groove recessed into the top end block surface, the right end block surface, the bottom end block surface, and the left end block surface;

a sealant injection hole penetrating inward from the outer end surface; and one or more sealant channels forming ducts between the sealant injection hole and the continuous encircling groove.

A7. The linear fixture of paragraph A5, wherein the first end block includes a continuous encircling groove recessed into the top end block surface, the right end block surface, the bottom end block surface, and the left end block surface; a sealant injection hole penetrating inward from the outer end surface; and one or more sealant channels forming ducts between the sealant injection hole and the continuous encircling groove, between the sealant injection hole and the cable tunnel, between the continuous encircling groove and the cable tunnel, and/or between the sealant injection hole and the S-shaped groove.

A8. The linear fixture of paragraph A4 including a first end cap and a first end gasket, the first end gasket and first end cap shaped to effect a water-tight seal between the first end cap and the top wall portion, bottom wall portion, right wall portion, and left wall portion of the heat sink at the first end when the first end cap is fastened to the first end block through use of the second fastening provision of the first end block.

A9. The linear fixture of paragraph A5 including a first end cap, a first end gasket, an electrical cable, and a cable gasket; the first end gasket and first end cap shaped to effect a water-tight seal between the first end cap and the top wall portion, bottom wall portion, right wall portion, and left wall portion of the heat sink at the first end when the first end cap is fastened to the first end block through use of the second fastening provision of the first end block; the first end cap having a cable exit hole through which the electrical cable is passed; the electrical cable lying within the S-shaped groove in the first end block and passing through the cable tunnel in the first end block; the first end gasket having a gasket cable hole through which the electrical cable is passed; the cable gasket surrounding the electrical cable and pressed at least partially into the recessed sealing surface surrounding the cable tunnel in the first end block; and the cable gasket effecting a water-tight seal between the electrical cable and the end cap.

A10. The linear fixture of paragraph A8, wherein the first end cap includes a turnaround groove shaped and positioned to allow the first portion of the lens gasket to be connected continuously to the second portion of the lens gasket by a turnaround portion of the lens gasket when the turnaround portion is positioned within the turnaround groove and to allow a water-tight seal to be effected between the lens and the first end cap along the entire turnaround groove, and wherein the first end gasket and the first end cap are shaped and positioned to effect between the first end cap and the first end of the heat sink a water-tight seal blocking intrusion of ambient liquid at the first end of the heat sink into the space occupied by the light-emitting element.

A11. The linear fixture of paragraph A3, further including two or more compression clips, each compression clip having a C-shaped cross section with a catch on one edge, each compression clip contacting the lens and contacting the heat sink and applying compression between the lens and the heat sink, the catch on each compression clip engaging a ridge on the heat sink with the effect that force is required to cause the catch to surmount the ridge when the compression clip is applied to or removed from the linear fixture.

INDUSTRIAL APPLICABILITY

The methods and apparatus described in the present disclosure are applicable to the general lighting industry, the decorative lighting industry, the specialty lighting industry, the agricultural lighting industry, the horticultural lighting industry, the research lighting industry, the military lighting industry, and all other industries in which LEDs or other electrically-powered sources are employed to produce light. They are also applicable to other industries in which a fixture with or without a cable must be sealed against environmental influences.

What is claimed is:

1. A linear fixture for protecting and removing heat from a light-emitting element, the light-emitting element having a thermal-interface surface that is substantially planar, and the light-emitting element having an electrical connector with one or more electrically conducting terminals emerging normal to the thermal-interface surface, the linear fixture comprising:

a heat sink having a first end and a second end, the heat sink extending along a length axis from the first end to the second end, and the heat sink having a substantially uniform cross section in planes normal to the length axis between the first end and the second end; the heat sink including a top wall portion, a bottom wall portion, a right wall portion, and a left wall portion, the four wall portions together encompassing on four sides an interior space; the bottom wall portion having on its side opposite the interior space a mounting surface of areal extent sufficient to allow contact with the thermal-interface surface of the light-emitting element; the bottom wall portion also having a connection port through which the one or more electrically conducting terminals emerging normal to the thermal-interface surface of the light-emitting element may pass to reach the interior space; and the interior space having disposed within it an electrical assembly including an electrical assembly connector positioned to make electrical contact with the one or more electrically conducting terminals.

2. The linear fixture of claim 1, wherein the heat sink includes a first groove and a second groove both located outside of the interior space in positions on opposite sides of a plane containing the length axis and oriented normal to the mounting surface of the bottom wall portion of the heat sink, the first groove and the second groove shaped to accept and hold in place a lens gasket.

3. The linear fixture of claim 2, further including a first portion of the lens gasket held in place within the first groove, a second portion of the lens gasket held in place within the second groove, and a light-transmitting lens in contact with the first portion and the second portion of the lens gasket, a water-tight seal being effected between the lens and the heat sink along the full length of the heat sink.

4. The linear fixture of claim 3 further including a first end block having a right end block surface adjacent to the right wall portion of the heat sink, a left end block surface adjacent to the left wall portion of the heat sink, a top end block surface adjacent to the top wall portion of the heat sink, a bottom end block surface adjacent to the bottom wall portion of the heat sink, and an outer end surface that may be flush with the first end of the heat sink, the first end block including a first fastening provision facilitating the fastening of the first end block to a wall portion of the heat sink, and a second fastening provision facilitating the fastening of an arbitrary object to the outer end surface of the first end block.

5. The linear fixture of claim 4, wherein the first end block includes an S-shaped groove recessed into the left end block surface, a cable tunnel exiting the outer end surface and penetrating to the S-shaped groove, and a recessed sealing surface surrounding the cable tunnel where the cable tunnel exits the outer end surface.

6. The linear fixture of claim 4, wherein the first end block includes a continuous encircling groove recessed into the top end block surface, the right end block surface, the bottom end block surface, and the left end block surface; a sealant injection hole penetrating inward from the outer end surface; and one or more sealant channels forming ducts between the sealant injection hole and the continuous encircling groove.

7. The linear fixture of claim 5, wherein the first end block includes a continuous encircling groove recessed into the top end block surface, the right end block surface, the bottom end block surface, and the left end block surface; a sealant injection hole penetrating inward from the outer end surface; and one or more sealant channels forming ducts between the sealant injection hole and the continuous encircling groove, between the sealant injection hole and the cable tunnel, between the continuous encircling groove and the cable tunnel, and/or between the sealant injection hole and the S-shaped groove.

8. The linear fixture of claim 4 including a first end cap and a first end gasket, the first end gasket and first end cap shaped to effect a water-tight seal between the first end cap and the top wall portion, bottom wall portion, right wall portion, and left wall portion of the heat sink at the first end when the first end cap is fastened to the first end block through use of the second fastening provision of the first end block.

9. The linear fixture of claim 5 including a first end cap, a first end gasket, an electrical cable, and a cable gasket; the first end gasket and first end cap shaped to effect a water-tight seal between the first end cap and the top wall portion, bottom wall portion, right wall portion, and left wall portion of the heat sink at the first end when the first end cap is fastened to the first end block through use of the second fastening provision of the first end block; the first end cap having a cable exit hole through which the electrical cable is passed; the electrical cable lying within the S-shaped groove in the first end block and passing through the cable tunnel in the first end block; the first end gasket having a gasket cable hole through which the electrical cable is passed; the cable gasket surrounding the electrical cable and pressed at least partially into the recessed sealing surface surrounding the cable tunnel in the first end block; and the cable gasket effecting a water-tight seal between the electrical cable and the end cap.

10. The linear fixture of claim 8, wherein the first end cap includes a turnaround groove shaped and positioned to allow the first portion of the lens gasket to be connected continuously to the second portion of the lens gasket by a turnaround portion of the lens gasket when the turnaround portion is positioned within the turnaround groove and to allow a water-tight seal to be effected between the lens and the first end cap along the entire turnaround groove, and wherein the first end gasket and the first end cap are shaped and positioned to effect between the first end cap and the first end of the heat sink a water-tight seal blocking intrusion of ambient liquid at the first end of the heat sink into the space occupied by the light-emitting element.

11. The linear fixture of claim 3, further including two or more compression clips, each compression clip having a C-shaped cross section with a catch on one edge, each compression clip contacting the lens and contacting the heat sink and applying compression between the lens and the heat sink, the catch on each compression clip engaging a ridge on the heat sink with the effect that force is required to cause the catch to surmount the ridge when the compression clip is applied to or removed from the linear fixture.

* * * * *